United States Patent
Watanabe

(10) Patent No.: US 9,177,589 B2
(45) Date of Patent: Nov. 3, 2015

(54) MAGNETIC RECORDING MEDIUM AND A METHOD OF MANUFACTURING THE SAME

(75) Inventor: Sadayuki Watanabe, Matsumoto (JP)

(73) Assignee: FUJI ELECTRIC CO., LTD. (JP)

( * ) Notice: Subject to any disclaimer, the term of this patent is extended or adjusted under 35 U.S.C. 154(b) by 250 days.

(21) Appl. No.: 11/682,961

(22) Filed: Mar. 7, 2007

(65) Prior Publication Data

US 2007/0218318 A1    Sep. 20, 2007

(30) Foreign Application Priority Data

Mar. 15, 2006 (JP) .................................. 2006-070492

(51) Int. Cl.

| G11B 5/66 | (2006.01) |
|---|---|
| G11B 5/855 | (2006.01) |
| G11B 5/738 | (2006.01) |
| G11B 5/74 | (2006.01) |
| B05D 5/12 | (2006.01) |
| G11B 5/667 | (2006.01) |
| G11B 5/73 | (2006.01) |

(52) U.S. Cl.
CPC . *G11B 5/855* (2013.01); *B05D 5/12* (2013.01); *G11B 5/667* (2013.01); *G11B 5/738* (2013.01); *G11B 5/7325* (2013.01); *G11B 5/743* (2013.01)

(58) Field of Classification Search
USPC ............... 428/826, 827, 828, 829, 832, 836, 428/836.1, 836.2, 837
See application file for complete search history.

(56) References Cited

U.S. PATENT DOCUMENTS

| 6,602,620 B1 * | 8/2003 | Kikitsu et al. ............. 428/842.2 |
| 6,759,149 B1 * | 7/2004 | Chen et al. .................... 428/828 |
| 2002/0086185 A1 | 7/2002 | Yasui et al. |
| 2002/0197516 A1 * | 12/2002 | Kirino et al. ............ 428/694 TS |
| 2003/0134151 A1 | 7/2003 | Usuki et al. |

(Continued)

FOREIGN PATENT DOCUMENTS

| CN | 1637866 A | 7/2005 |
| CN | 1674104 A | 9/2005 |

(Continued)

OTHER PUBLICATIONS

Search & Examination Report issued in corresponding Singapore Patent Application No. 200701312-1 dated Aug. 25, 2009.

(Continued)

*Primary Examiner* — Holly Rickman
*Assistant Examiner* — Lisa Chau
(74) *Attorney, Agent, or Firm* — Rossi, Kimms & McDowell LLP

(57) ABSTRACT

A magnetic recording medium having magnetic dots that can achieve high density recording is disclosed. The magnetic recording medium comprises at least an underlayer, a magnetic recording layer, and a protective layer sequentially laminated on a nonmagnetic substrate. The underlayer is composed of ruthenium or an alloy of mainly ruthenium and has an undulating structure formed with ridge lines in a predetermined pitch on the surface of the underlayer. The magnetic recording layer contains at least ferromagnetic crystal grains and a nonmagnetic component. Magnetic dots composed of crystal grains with a grain size not smaller than 4 nm in the magnetic recording layer are aligned on a surface of the underlayer along the ridge line, and each of the magnetic dots s separated by the nonmagnetic component from each other. A simple manufacturing method for this medium also is disclosed.

24 Claims, 3 Drawing Sheets

(56) References Cited

U.S. PATENT DOCUMENTS

| | | | |
|---|---|---|---|
| 2004/0101713 A1* | 5/2004 | Wachenschwanz et al. | 428/694 SG |
| 2004/0202843 A1* | 10/2004 | Moriwaki et al. | 428/195.1 |
| 2004/0219394 A1* | 11/2004 | Kawai et al. | 428/694 EC |
| 2005/0031905 A1 | 2/2005 | Yasui et al. | |
| 2005/0142387 A1* | 6/2005 | Araki et al. | 428/694 BS |
| 2005/0214520 A1* | 9/2005 | Oikawa et al. | 428/323 |
| 2005/0287397 A1* | 12/2005 | Soeno et al. | 428/831 |

FOREIGN PATENT DOCUMENTS

| | | |
|---|---|---|
| JP | 2002-175621 A | 6/2002 |
| JP | 2003-016623 A | 1/2003 |
| JP | 2004-227740 A | 8/2004 |
| JP | 2004-342205 A | 12/2004 |
| JP | 2004342205 A * | 12/2004 |
| JP | 2005-018947 A | 1/2005 |
| JP | 2005-190552 A | 7/2005 |
| JP | 2006-286158 A | 10/2006 |

OTHER PUBLICATIONS

Notice of Second Office Action issued in corresponding Chinese Patent Application No. 200710088666.7 dated Nov. 25, 2010. Full English translation provided.

Notice of Reasons of Rejection issued in corresponding Japanese Patent Application No. 2006-070492 dated Feb. 2, 2010. Abridged English translation provided.

First Office Action issued in corresponding Chinese Patent Application No. 200710088666.7 dated Mar. 10, 2010. Japanese translation is also provided.

* cited by examiner 4-2: nonmagnetic component
(including 4-3: superparamagnetic grains)
4-1: magnetic dot
5: protective layer
4: magnetic recording layer
3: underlayer
2: soft magnetic backing layer
1: nonmagnetic substrate line direction

MAGNETIC RECORDING MEDIUM AND A METHOD OF MANUFACTURING THE SAME

CROSS REFERENCE TO RELATED APPLICATIONS

This application is based on, and claims priority to, Japanese Patent Application No. 2006-070492, filed on Mar. 15, 2006, the contents of which are incorporated herein by reference in their entirety.

BACKGROUND OF THE INVENTION

A. Field of the Invention

The present invention relates to magnetic recording media installed in various magnetic recording devices, and to a method of manufacturing the media.

B. Description of the Related Art

Recently, "a perpendicular magnetic recording system" has been applied in practical use in place of conventional "longitudinal magnetic recording system" for enhancing the magnetic recording density. The recording magnetization is perpendicular to the medium surface in the perpendicular magnetic recording system. A perpendicular magnetic recording medium (hereinafter also simply referred to as "a perpendicular medium") is mainly composed of a magnetic recording layer of a hard magnetic material, an underlayer for perpendicularly orienting the recording magnetization in the magnetic recording layer, a protective layer for protecting the surface of the magnetic recording layer, and a backing layer of a soft magnetic material for concentrating a magnetic flux generated by a magnetic head used for recording onto the magnetic recording layer.

In both longitudinal and perpendicular systems currently, the materials of the magnetic recording layer assume "a granular structure" in which ferromagnetic grains are separated by a nonmagnetic component. Preferable specific materials are CoPtCr alloy, and this alloy with an additive of oxide, for example, $CoPtCr-SiO_2$ (Japanese Unexamined Patent Application Publication No. 2005-190552, which corresponds to US 2005/0142387 and Japanese Unexamined Patent Application Publication No. 2004-227740).

The perpendicular magnetic recording system has such advantages that the magnetization is more stable when recording density becomes higher, resistance to thermal fluctuation is better than in a longitudinal system, and signals are stably maintained even in small recording bits. In a medium of the granular structure, the grain size is controlled by an underlayer, and one magnetic crystal grain grows on one underlayer crystal grain to reduce magnetic interaction between magnetic grains and enhance the recording density, as disclosed in Japanese Unexamined Patent Application Publication No. 2005-190552, which corresponds to US 2005/0142387, for example.

However, since one bit is made up of a plurality of grains, "transition noise" due to a zigzag configuration between the bits along the grains causes a significant problem of degradation in signal quality. This problem is common in both longitudinal and perpendicular systems, and is a critical factor that limits recording density in the perpendicular magnetic recording system.

As a means to overcome this problem, "patterned media" in which one dot (one grain) is one bit are considered promising for a recording medium of the next generation. Because one bit is composed of one dot, the problem of "transition noise" is eliminated. So, the patterned media are expected to achieve higher recording density.

Several techniques appeared recently for manufacturing the patterned media. A typical example utilizes techniques in semiconductor processing, in which a substrate or a magnetic film is worked out to a dofted configuration using a resist film, and through a planarizing process such as polishing, a magnetic recording medium is produced (Japanese Unexamined Patent Application Publication No. 2003-16623, for example). Another technique forms extremely small holes (nanoholes) and fills the holes with magnetic material to form magnetic dots (Japanese Unexamined Patent Application Publication No. 2002-175621, which corresponds to US 2002/0086185 and US 2005/0031905, for example).

All the patterned media having regularly arranged dots as mentioned above involve a serious problem in the manufacturing process thereof. The problem is how to form and arrange the dots in a simple process. In a disk substrate as practically employed at present, it is very difficult to regularly arrange the dots in circumferential and radial directions. It is possible to make a dot pattern using a semiconductor process as described above, however, it requires a tremendous processing time. Moreover, it is very difficult to form every fine dot having a dot size less than 30 nm, for example, with sufficient accuracy. Processing of a magnetic film raises a problem of degradation of magnetic property due to thermal damage. Formation of nanoholes at the present state of the art presents difficulty in compatibility between minimization and regular arrangement. In addition, the process is complicated because a planarizing treatment of the surface is needed after filling the holes with magnetic material.

As described thus far, the proposed techniques of dot formation in the patterned medium are complicated and involve various problems in manufacturing the patterned medium. In view of the foregoing, it is an object of the present invention to provide a magnetic recording medium having magnetic dots achieving high density recording, and to provide a method of manufacturing such a magnetic recording medium in a simple process, and the present invention is directed to overcoming or at least reducing the effects of one or more of the problems set forth above.

SUMMARY OF THE INVENTION

To attain these and other objects, a magnetic recording medium according to the invention comprises a nonmagnetic substrate, and at least an underlayer, a magnetic recording layer, and a protective layer sequentially laminated on the nonmagnetic substrate, wherein the underlayer is composed of ruthenium or an alloy of mainly ruthenium and has an undulating structure formed by ridge lines with a predetermined pitch on the surface of the underlayer. The magnetic recording layer contains at least ferromagnetic crystal grains and a nonmagnetic component, and magnetic dots composed of the crystal grains with a grain size not smaller than 4 nm in the magnetic recording layer are aligned on a surface of the underlayer along the ridge line. Each of the magnetic dots is separated from the others by the nonmagnetic component.

The underlayer of ruthenium or an alloy of mainly ruthenium (hereinafter also referred to as "a ruthenium underlayer") is preferably composed of a single crystal or a polycrystalline structure with a grain boundary width of not larger than 0.5 nm. The undulating structure of the ruthenium underlayer surface preferably has a configuration in which an angle between a plane of the nonmagnetic substrate and a line connecting a top and a bottom of the undulating structure in a cross sectional plane perpendicular to the ridge line is preferably in a range of 10 to 60 degrees. The pitch of the ridge lines is preferably in the range of 5 to 50 nm.

The magnetic recording layer can contain superparamagnetic grains that have turned to a superparamagnetic substance and can be located on the bottom line of the undulating structure of the ruthenium underlayer surface.

The nonmagnetic substrate can be a disk, on each surface of which are formed the ruthenium underlayer, the magnetic recording layer, and the protective layer; and the ruthenium underlayer can have the undulating structure formed by ridge lines of concentric circles with a predetermined pitch on a surface of the ruthenium underlayer. The magnetic recording medium preferably further comprises a soft magnetic backing layer provided between the nonmagnetic substrate and the ruthenium underlayer.

Such a magnetic recording medium of the invention can be manufactured by a method comprising a step of physically processing a surface of the soft magnetic backing layer to form the undulating structure on the surface of the ruthenium underlayer through reflecting the surface configuration of the backing layer in the surface configuration of the ruthenium underlayer. Alternatively it can be formed by a method comprising a step of physically processing a surface of the nonmagnetic substrate to form the undulating structure on the surface of the ruthenium underlayer through reflecting the surface configuration of the nonmagnetic substrate in the surface configuration of the ruthenium underlayer; or a method comprising a step of physically processing a surface of the ruthenium underlayer to form the undulating structure on the surface of the ruthenium underlayer itself.

A magnetic recording layer in the invention has magnetic dots of ferromagnetic crystal grains that are surrounded by a nonmagnetic component. Magnetic dots each bearing one bit of record in the magnetic recording layer are composed of crystal grains having a grain size not smaller than 4 nm, more preferably not smaller than 10 nm, and arranged on the ridge lines of the undulating structure formed on the surface of the ruthenium underlayer. Superparamagnetic grains that are nonmagnetic at around the room temperature and have a grain size less than 4 nm can exist on the bottom line of the undulating structure.

The undulating structure formed on the ruthenium underlayer is provided for the magnetic dots to form and align on the structure. The undulating structure on the ruthenium underlayer for aligning magnetic dots can be formed by physically forming an undulating structure on the surface of the nonmagnetic substrate and reflecting the structure on the nonmagnetic substrate in the surface of the underlayer. In the case a soft magnetic backing layer is provided, the undulating structure on the ruthenium underlayer for aligning magnetic dots can be formed by physically forming an undulating structure on the surface of the backing layer and reflecting the structure on the backing layer in the surface of the underlayer. The undulating structure can also be formed directly on the ruthenium surface itself. The undulating structure can be formed by means of direct patterning using electron beam (EB) on the nonmagnetic substrate, the soft magnetic backing layer, or the ruthenium underlayer.

When a magnetic recording layer is deposited by means of sputtering or the like on the whole surface of a ruthenium underlayer having a surface configuration of the undulating structure as described above, magnetic grains with a grain size not smaller than 4 nm align on the ridge lines of the undulating structure. The mechanism can be considered that the ferromagnetic particles for the magnetic recording layer reach the ruthenium underlayer surface and the atoms of the ferromagnetic particles move through a surface migration process promoted by high surface energy of the ruthenium underlayer, and preferentially move towards the ridge of the undulating structure. If the width of the grain boundary in the surface region of the ruthenium underlayer is large, the migration of the magnetic particles is obstructed by the grain boundary. Consequently, a single crystal film is ideal for the underlayer. Nevertheless, a polycrystalline film with a grain boundary width not larger than 0.5 nm is also permissible.

The dots are magnetically isolated from each other because the dots are separated by the additive of the nonmagnetic substance. Plural dots of magnetic particles can grow on one crystal grain of the ruthenium underlayer, or one dot of magnetic particle can grow over plural grains of ruthenium underlayer. The size and distance of the magnetic dots on the ridge line can be changed by changing an amount of additives in the magnetic component, deposition conditions of the magnetic recording layer, and annealing conditions after the deposition corresponding to the line pitch of the undulating structure. The processes of deposition and heating are similar to those used in manufacturing conventional magnetic recording media, and simple processes.

The method of the invention does not include any step of machining or processing a magnetic recording layer for forming the magnetic dots. Consequently, the magnetic properties of the dots are not degraded by the damage due to such processing. When the difference in height between the top and bottom lines of the undulating structure is controlled in the range from less than 1 nm to several nm, a planarization treatment such as polishing is not needed, and coverage with the protective layer is secured, and thus no problem of corrosion is caused. Flying performance is also good in employing a flying magnetic head that is used in normal magnetic recording systems. Processing of the undulating structure can be simplified by employing direct patterning by EB, which does not include steps of coating and removal of resist. Batch patterning on a large area can be carried out as well by employing a stamp technique of a master disk.

The substrate texturing techniques commonly used at present do not carry out accurate control of the line pitch, and cause crossing of grooves. The technology in Japanese Unexamined Patent Application Publication No. 2005-190552, which corresponds to US 2005/0142387, Japanese Unexamined Patent Application Publication No. 2003-16623, Japanese Unexamined Patent Application Publication No. 2002-175621, which corresponds to US 2002/0086185 and US 2005/0031905, and Japanese Unexamined Patent Application Publication No. 2004-227740 have a layer structure that is similar in some extent to that of the present invention and use these commonly used texturing techniques. However, the fine structure of the underlayer is different. As a result, the magnetic dots as in the present invention cannot be formed.

A magnetic recording medium of the invention achieves high density recording, in which one bit is a magnetic dot composed of a crystal grain, with a grain size not smaller than 4 nm, in the magnetic recording layer that is laminated on a ruthenium underlayer having an undulating structure on the surface thereof.

Such a magnetic recording medium of the invention can be manufactured by a simple process in which an undulating structure is formed on the surface of the ruthenium underlayer and a magnetic recording layer is deposited on this surface.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

Some preferred embodiments according to the invention will be described in the following with reference to the accompanying drawings.

Figure 1:
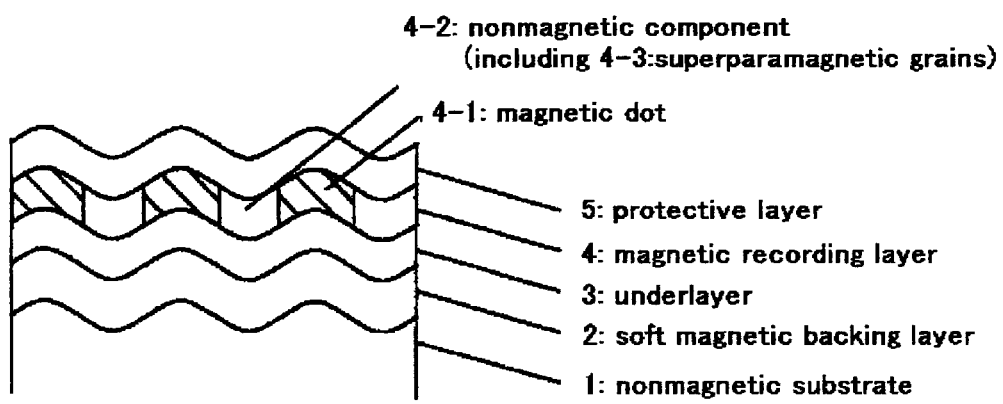
FIG. 1 is a schematic sectional view showing a structure of a perpendicular magnetic recording medium of a first embodiment according to the invention in which an undulating structure is formed on the surface of a nonmagnetic substrate and reflected in the configuration of the underlayer surface.
Figure 2:
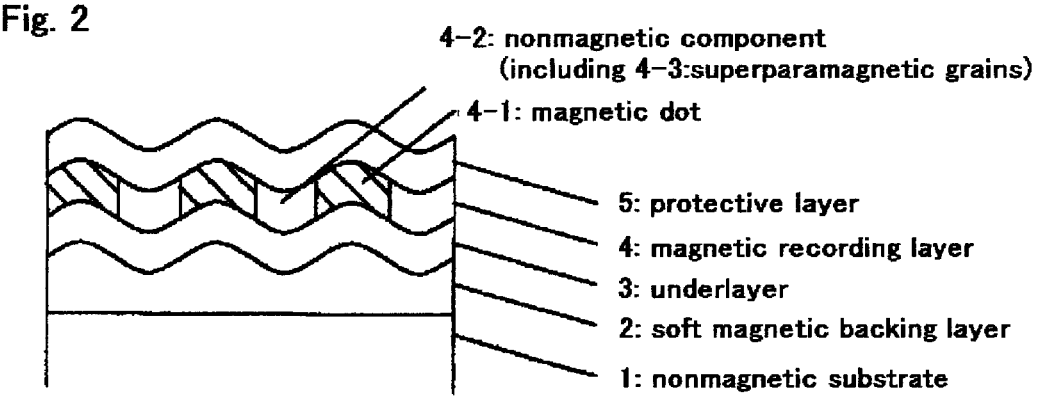
FIG. 2 is a schematic sectional view showing a structure of a perpendicular magnetic recording medium of a second embodiment according to the invention in which an undulating structure is formed on the surface of a soft magnetic backing layer and reflected in the configuration of the underlayer surface.
Figure 3:
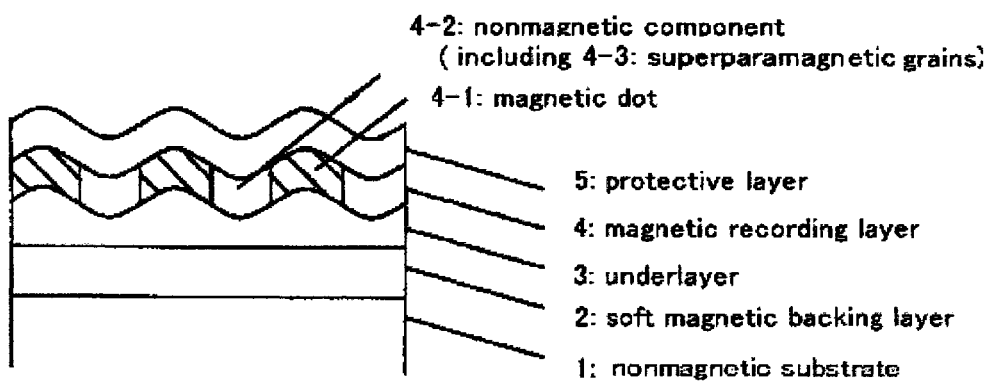
FIG. 3 is a schematic sectional view showing a structure of a perpendicular magnetic recording medium of a third embodiment according to the invention in which an undulating structure is formed directly on the surface of an underlayer.

FIGS. 1 through 3 are schematic sectional views showing structures of perpendicular magnetic recording media having a soft magnetic backing layer in first through third embodiments according to the present invention.

Each of the perpendicular magnetic recording media of these embodiments comprises soft magnetic backing layer 2, underlayer 3, magnetic recording layer 4, and protective layer 5 sequentially laminated on nonmagnetic substrate 1. A lubricant layer can be further formed on protective layer 5. Soft magnetic backing layer 2 can be eliminated. Soft magnetic backing layer 2, underlayer 3, magnetic recording layer 4, and protective layer 5 also can be provided on the other surface of nonmagnetic substrate 1, though not shown in the figures.

FIG. 1 shows a first embodiment in which an undulating structure is physically formed on the surface of nonmagnetic substrate 1 and the other layers are sequentially laminated on the substrate. FIG. 2 shows a second embodiment in which the surface of nonmagnetic substrate 1 is flat, and after depositing soft magnetic backing layer 2 on nonmagnetic substrate 1, an undulating layer structure is physically formed on the surface of soft magnetic backing layer 2, followed by sequentially laminating the other layers. FIG. 3 shows a third embodiment in which soft magnetic backing layer 2 and underlayer 3 are formed on a flat nonmagnetic substrate surface and then an undulating structure is physically formed on the surface of underlayer 3, followed by sequentially laminating the other layers.

Figure 4:
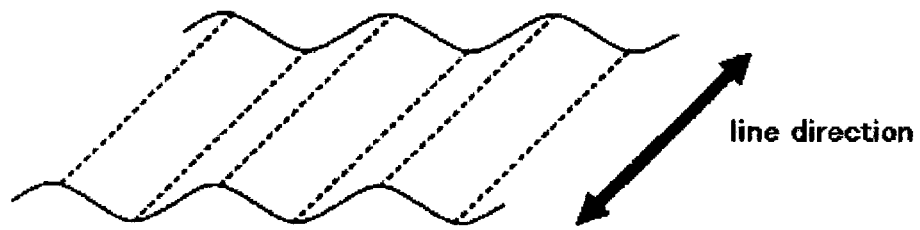
FIG. 4 is a schematic perspective view showing an undulating structure on an underlayer of a perpendicular magnetic recording medium of an embodiment according to the invention.

On the surface of underlayer 3, an undulating structure with ridge lines aligned with a predetermined pitch is formed as shown in FIG. 4, for example. The undulating structure in a cross sectional view perpendicular to the ridge line preferably has the configuration of a sinusoidal waveform as shown in FIGS. 1 through 3. The undulating structure in this cross sectional view has a configuration in which an angle between a plane of the nonmagnetic substrate and a line connecting a top and a bottom of the undulating structure is preferably in a range of 10 to 60 degrees. The line pitch (a distance between a ridge line and the next ridge line) is preferably in the range of 5 to 50 nm. It is important to keep the pitch approximately constant.

Figure 5:
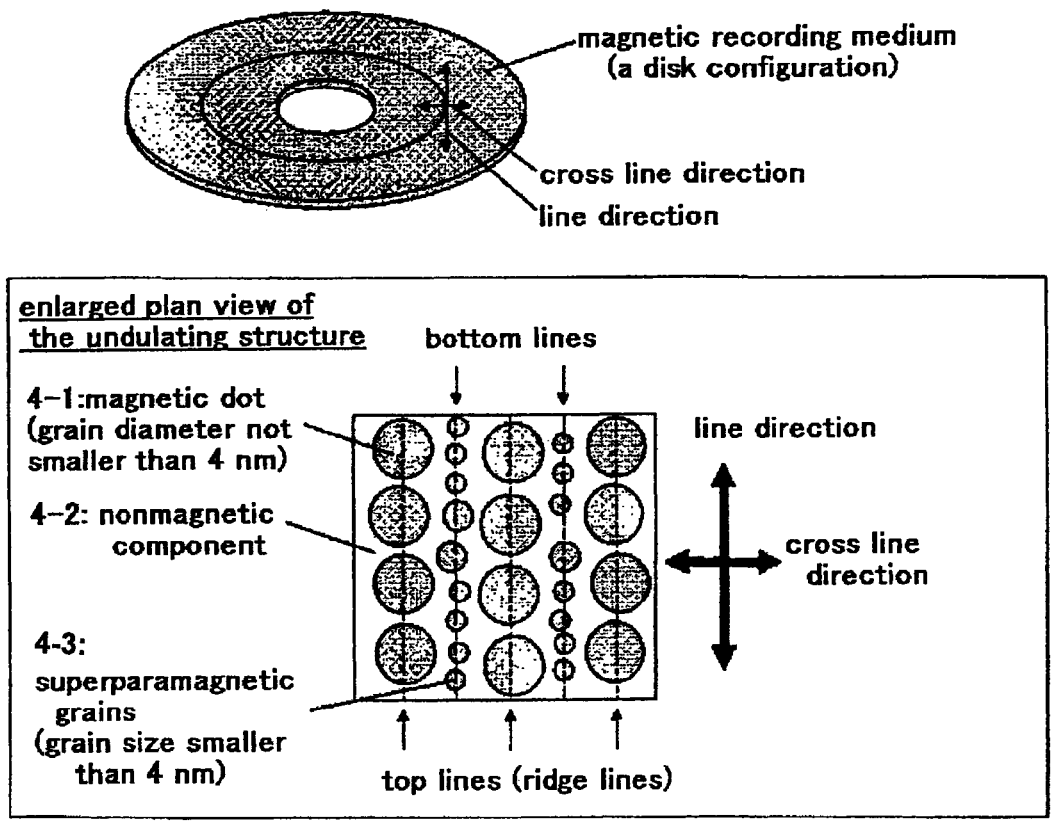
FIG. 5 is a drawing illustrating the relation between the undulating structure on the underlayer surface and the structure of the magnetic recording layer in a perpendicular magnetic recording medium of an embodiment according to the invention.

FIG. 5 shows schematically a microscopic structure of magnetic recording layer 4 seen from above nonmagnetic substrate 1 in the case of a disk substrate. Magnetic dots 4-1, each composing a recoding bit, are composed of crystal grains with a grain size not smaller than 4 nm and aligning on the ridge lines separated by nonmagnetic component 4-2. Particles can exist also on the bottom line of the undulating structure. But in order to avoid magnetic interference with the recording bits on the ridge line, those particles are preferably superparamagnetic particles 4-3 with a particle size less than 4 nm so that the particles turn to superparamagnetic and do not exhibit magnetization.

Nonmagnetic substrate 1 in these embodiments of perpendicular magnetic recording medium can be a disk substrate composed of NiP-plated aluminum alloy, glass or crystallized glass that are used in usual magnetic recording media. If the temperature of substrate heating is controlled under about 100° C., plastic substrate of a resin such as polycarbonate or polyolefin can be used, too. A silicon substrate can be used as well.

Soft magnetic backing layer 2 is preferably provided to control the magnetic flux from the magnetic head and improve recording and reproduction performance in the case of an existing perpendicular magnetic recording medium, for example. The soft magnetic backing layer can be omitted. Soft magnetic backing layer 2 can be composed of, for example, crystalline NiFe alloy, a Sendust alloy (FeSiAl), CoFe alloy or the like, or microcrystalline FeTaC, CoFeNi, CoNiP and the like. Large saturation magnetization is favorable for enhancing recording capability.

The optimum thickness of the soft magnetic backing layer, depending on the structure and characteristic of a magnetic head used for magnetic recording, is preferably in the range of 10 nm to 500 nm in the balance with productivity when it is continuously deposited with other layers.

Soft magnetic backing layer 2 can be formed by means of a plating method as well as the sputtering method that is generally employed. A relatively thick soft magnetic layer may form magnetic domain walls and generate a perpendicular component of magnetization. To avoid this phenomenon, magnetic backing layer 2 can include an anti-ferromagnetic layer in addition to a soft magnetic layer. The anti-ferromagnetic layer can be disposed immediately under, immediately over, or within a soft magnetic layer. A lamination of both types of layers is possible, too. Moreover, soft magnetic backing layer 2 can take a laminated structure of soft magnetic layers and nonmagnetic layers.

Underlayer 3 is necessary to align the magnetic dots of magnetic recording layer 4, which is deposited immediately after depositing underlayer 3. A material of the underlayer is composed of primarily ruthenium, as a single crystal or a polycrystalline film with a grain boundary width not larger than 0.5 nm. An undulating structure must be formed on the surface of underlayer 3. The crystal alignment is appropriately controlled depending on the material of magnetic recording layer 4 provided on the underlayer. Basically, a hexagonal closed-packed structure (hcp) and its (002) aligned parallel to the film surface are preferable. To enhance this alignment, an alignment control layer can be provided immediately under underlayer 3.

A magnetic recording layer 4 has a structure comprising magnetic dots 4-1 of ferromagnetic grains and nonmagnetic component 4-2 surrounding the magnetic dots as shown in FIG. 5. The magnetic dots 4-1 are aligned along the ridge lines formed on the surface of underlayer 3.

The magnetic dot 4-1 contains at least one of cobalt, iron and nickel, and preferably exhibits large anisotropy in the perpendicular direction. More specifically, preferred materials include platinum-containing alloy such as CoPt alloy and FePt alloy. Because magnetic recording layer 4 does not suffer from machining damage, ordered alloys exhibiting large anisotropy can be favorably used as well.

Nonmagnetic component 4-2 is preferably composed of oxide or nitride. It is preferable for promoting grain growth on the ridge line to heat the substrate before depositing magnetic recording layer 4 or to anneal the substrate after depositing the magnetic recording layer. One or both of these measures can be implemented. The heating temperature is preferably in the range of 150 to 600° C. considering productivity.

Protective layer 5 can be the same as a conventional protective film and composed of mainly carbon. The protective layer is not necessarily a single layer, but also possible are two carbon layers with different properties, a laminate of a metal film and a carbon film, and a laminate of an oxide film and a carbon film.

Processing of the undulating structure can be carried out by various techniques including direct patterning using an electron beam (EB), patterning using a resist film, and stamping using a master disk.

EXAMPLES

Examples 1 through 3, which correspond to and more specifically explain the first through third embodiments, respectively, will be described in the following. The invention, however, shall not be limited to the Examples.

Example 1

Nonmagnetic substrate 1 was a silicon substrate in a disk shape with a smooth surface of a surface roughness Ra=0.5 nm. After cleaning, the substrate was introduced into an EB apparatus and line processing was conducted on the substrate surface. The processing was carried out fixing the position of the electron beam and moving the substrate horizontally in the radial direction while rotating the substrate to make concentric circles. The distance between the ridge lines was controlled to 25 nm and the difference in height between top and bottom lines of the undulating structure was controlled to 10 nm. Then, the substrate was introduced into a sputtering apparatus and soft magnetic backing layer 2 of amorphous CoZrTa was formed to a thickness of 100 nm using a target of $Co_{92}Zr_5Ta_3$ under an argon gas pressure of 5 mTorr. Subsequently, ruthenium underlayer 3 having a thickness of 5 nm was deposited using a ruthenium target under an argon gas pressure of 3 mTorr. Then, magnetic recording layer 4 of CoPt—$SiO_2$ was formed using a target of $(Co_{80}Pt_{20})_{90}(SiO_2)_{10}$. Magnetic recording layer 4 was deposited under an argon gas pressure of 60 mTorr and had a thickness of 8 nm. After that, vacuum heating treatment was conducted at a temperature of 400° C. After cooling the substrate down to 100° C. in a cooler chamber, protective layer 5 of carbon was deposited to a thickness of 4 nm by a CVD method and the substrate was taken out from the vacuum apparatus. Finally, a liquid lubricant layer of perfluoropolyether having a thickness of 2 nm was formed by means of a dip coating method. Thus, a magnetic recording medium of Example 1 was manufactured. Deposition of every layer was conducted by a DC magnetron sputtering method. Transfer between the EB apparatus and the sputtering apparatus was conducted in a vacuum.

Example 2

Nonmagnetic substrate 1 used was the same as that in Example 1. After cleaning, the substrate was introduced into a sputtering apparatus and soft magnetic backing layer 2 of CoZrTa having a thickness of 100 nm was formed in the same manner as in Example 1. Introducing the substrate into an EB apparatus, a line processing was conducted on the surface of soft magnetic backing layer 2. Concentric circles were formed in the line processing in the same manner as in Example 1. The distance between the ridge lines was controlled to 25 nm and the difference in height between top and bottom lines of the undulating structure was controlled to 3 nm. After that, ruthenium underlayer 3, magnetic recording layer 4 of CoPt—$SiO_2$, carbon protective layer 5, and a liquid lubricant layer were sequentially formed in the same manner as in Example 1. Thus, a magnetic recording layer of Example 2 was manufactured.

Example 3

Nonmagnetic substrate 1 used was the same as that in Example 1. After cleaning, the substrate was introduced into a sputtering apparatus and soft magnetic backing layer 2 of CoZrTa having a thickness of 100 nm and ruthenium underlayer 3 having a thickness of 5 nm were formed in the same manner as in Example 1. Introducing the substrate into an EB apparatus, a line processing was conducted on the surface of ruthenium underlayer 3. Concentric circles were formed in the line processing in the same manner as in Example 1. The distance between the ridge lines was controlled to 25 nm and the difference in height between top and bottom lines of the undulating structure was controlled to 3 nm. After that, magnetic recording layer 4, protective layer 5, and a liquid lubricant layer were sequentially formed in the same manner as in Example 1. Thus, a magnetic recording layer of Example 3 was manufactured.

Comparative Example 1

A magnetic recording medium of Comparative Example 1 was manufactured in the same manner as in Example 1 except that a line processing using an EB apparatus was not conducted.

Comparative Example 2

A magnetic recording medium of Comparative Example 2 was manufactured in the same manner as in Example 1 except that in the process of forming underlayer 3, a titanium underlayer 3 having a thickness of 5 nm was deposited using a titanium target under an argon gas pressure of 5 mTorr.

Evaluation

The following describes the performance evaluation results on the perpendicular media of the Examples and Comparative Examples.

First, evaluation of the fine structure of the perpendicular media of Examples was conducted. A TEM (a transmission electron microscope) was used for the structure analysis. Planar observation was conducted in a visual field of 0.2 μm×0.2 μm and grain sizes were obtained in this field. Alignment of grains along the ridge lines was confirmed in Examples 1 through 3, in which an undulating structure was formed on the surface of the ruthenium underlayer. It was also observed that fine grains were scattering along the bottom lines of the undulating structure. Judgment whether on the top line or bottom line was supported by the results of cross-sectional observation.

In Comparative Example 1 having a flat ruthenium underlayer without an undulating structure, in contrast, randomly distributing grains were observed, that is, a structure of a usual granular film. In Comparative Example 2, which uses an underlayer material of titanium, despite that an undulating structure was formed, the observed structure was a usual granular structure like in Comparative Example 1.

Table 1 summarizes the results of these TEM planar observations. The data on Examples 1 through 3 are shown separately for top lines and bottom lines of the undulating structure. For the data on the top lines, an average dot distance (width of the nonmagnetic component) was also given, where the dot distance is defined by the gap between the adjacent dots at the narrowest place. As for the data on Comparative Examples 1 and 2, in which no uneven distribution was observed, only average grain size and average grain boundary width averaged over whole view field are given. The average grain boundary width was obtained by tracing the grain boundaries on the obtained image using an image analysis system, defining: average grain boundary width t=((total area of grain boundary/number of measured grains)/average perimeter of grains)×2.

TABLE 1

| | on top lines average grain size [nm] | on top lines average dot distance [nm] | on bottom lines average grain size [nm] |
|---|---|---|---|
| Example 1 | 18.5 | 3.1 | 2.9 |
| Example 2 | 19.0 | 2.8 | 3.2 |
| Example 3 | 18.7 | 3.0 | 3.1 |
| Comp Ex 1 (*) | 9.6 | 0.8 | — |
| Comp Ex 2 (*) | 10.1 | 0.6 | — |

(*) Because of no distinction of distribution between on top lines and bottom lines, the average values are averaged over the whole view field. The dot distance corresponds to a grain boundary width.

Table 1 shows that Examples 1 through 3 have similar structures with the dot size on the ridge lines of about 19 nm in diameter and dot distance of about 3 nm. Sectional TEM observation was conducted on the surface configuration of the ruthenium underlayer immediately before depositing the magnetic recording layer in the Examples, exhibiting the distance between the ridge (top) lines of 25 nm and the difference in height between the top line and bottom line of about 3 nm, without significant difference between the Examples. It can be considered that the structures of the magnetic recording layers of Examples were nearly the same because the surface configuration of the ruthenium underlayer was similar and the conditions of the subsequent deposition of magnetic recording layer were equivalent. The average grain size was about 3 nm on the bottom lines, which suggest that the grains had turned to a superparamagnetic state.

The effect of the configuration of the underlayer and the material (ruthenium) have been clarified by the fact that the structure as observed in Examples 1 through 3 was not seen in Comparative Examples 1 and 2 as described previously.

To examine whether each dot behaves as one bit or not, observation of a magnetized state was conducted using an MFM (a magnetic force microscope) while applying a magnetic field in a direction perpendicular to the film surface. The evaluation was made after two types of magnetic field application, namely, after DC demagnetization in which a magnetic field was applied in one direction, and after AC demagnetization in which the polarity of the magnetic field was alternated and the amplitude was gradually decreased.

In the evaluation on Examples 1 through 3, output signal was detected only from the dots on the top lines (ridge lines). It was revealed that every dot was magnetized in one direction in the DC demagnetization and the dots were randomly magnetized in both positive and negative directions in AC demagnetization. No signal of magnetization was detected from the bottom line. It can be considered that the grains in this location have turned to a superparamagnetic state because of their minute grain size.

In Comparative Examples 1 and 2, on the other hand, uniform magnetization over the whole surface was detected in the DC demagnetization, and an image of magnetization inversion of a lump of particles with a size of several tens of nm was obtained in the AC demagnetization, which was the general feature of a granular structure.

The patterned media of the aforementioned Examples comprised the magnetic dots in approximately cylindrical shape aligned along concentric circles on a disk substrate, with an average dot size of 19 nm in diameter, an average height of 8 nm, an average dot distance of about 3.0 nm, and a line pitch of 25 nm. The dot size, dot distance, and the magnetic properties of the dots can be appropriately changed by changing thickness, deposition conditions, and surface configuration of the ruthenium underlayer, and thickness, composition, and deposition conditions of the magnetic recording layer. These parameters can be designed considering primarily the required recording density and the maximum write magnetic field of the magnetic head used for writing. The invention can be applied, in addition to the existing magnetic recording system, to a write method used in magneto-optic recording, in which a magnetic property of coercivity is thermally decreased using a laser.

Thus, a magnetic recording medium and a method of manufacturing it have been described according to the present invention. Many modifications and variations may be made to the techniques and structures described and illustrated herein without departing from the spirit and scope of the invention. Accordingly, it should be understood that the media and methods described herein are illustrative only and are not limiting upon the scope of the invention.

DESCRIPTION OF SYMBOLS

1: nonmagnetic substrate
2: soft magnetic backing layer
3: underlayer
4: magnetic recording layer
5: protective layer
4-1: magnetic dot
4-2: nonmagnetic component
4-3: superparamagnetic grain

What is claimed is:

1. A magnetic recording medium comprising:
    a nonmagnetic substrate, and at least an underlayer, magnetic recording layer, and a protective layer sequentially laminated on the nonmagnetic substrate,
    wherein
    the underlayer is composed of ruthenium or an alloy of mainly ruthenium and has an undulating structure formed on the surface of the underlayer with ridge lines of concentric circles which have a pitch in the range of 5 to 50 nm, the undulating structure being a sinusoidal waveform in which an angle between a plane of the nonmagnetic substrate and a line connecting a top and a bottom of the undulating structure in a cross sectional plane perpendicular to the ridge line is in a range of 10 to 60 degrees;

the magnetic recording layer contains at least ferromagnetic crystal grains and a nonmagnetic component;

magnetic dots composed of the crystal grains with a grain size not smaller than 4 nm in the magnetic recording layer are aligned on the ridge lines of the underlayer, each magnetic dot bearing one bit of record and each of the magnetic dots is separated from each other by the nonmagnetic component, with the proviso that, superparamagnetic crystal grains on a bottom line of the undulating structure, if present, have a grain size less than 4 nm and do not exhibit magnetization.

2. The magnetic recording medium according to claim 1, wherein the underlayer is composed of (i) a single crystal, or (ii) a polycrystalline structure with a grain boundary width not larger than 0.5 nm.

3. The magnetic recording medium according to claim 1, wherein the magnetic recording layer contains superparamagnetic grains that have turned to a superparamagnetic substance and are located on the bottom line of the undulating structure of the underlayer surface.

4. The magnetic recording medium according to claim 1, wherein the nonmagnetic substrate is a disk, on both surfaces of which are formed the underlayer, the magnetic recording layer, and the protective layer; and the underlayer has the undulating structure formed by ridge lines of concentric circles with a predetermined pitch on a surface of the underlayer.

5. The magnetic recording medium according to claim 1, further comprising a soft magnetic backing layer provided between the nonmagnetic substrate and the underlayer.

6. A method of manufacturing the magnetic recording medium defined by claim 5, the method comprising a step of physically processing a surface of the soft magnetic backing layer to form the undulating structure on the surface of the underlayer by reproducing the surface configuration of the backing layer in the surface configuration of the underlayer.

7. A method of manufacturing a magnetic recording medium defined by claim 1, the method comprising a step of physically processing a surface of the nonmagnetic substrate to form the undulating structure on the surface of the underlayer by reproducing the surface configuration of the nonmagnetic substrate in the surface configuration of the underlayer.

8. A method of manufacturing a magnetic recording medium defined by claim 1, the method comprising a step of physically processing a surface of the underlayer to form the undulating structure on the surface of the underlayer.

9. A method of manufacturing a magnetic recording medium defined by claim 1, the method comprising:

providing a nonmagnetic substrate with an underlayer of ruthenium or an alloy of mainly ruthenium, physically processing a surface of the underlayer to form an undulating structure on the surface of the underlayer, and then depositing a magnetic recording material as dots on the undulating structure of the underlayer, wherein the dots are magnetic grains having a grain size not smaller than 4 nm which are aligned along the ridge lines and are magnetically isolated from each other by a nonmagnetic substance.

10. The method according to claim 9, wherein the magnetic recording layer is deposited by sputtering.

11. The magnetic recording medium according to claim 1, wherein the underlayer is adjacent the magnetic recording layer, and the protective layer is adjacent the magnetic recording layer.

12. The magnetic recording medium according to claim 11, further comprising a soft magnetic backing layer adjacent to the nonmagnetic substrate and to the underlayer.

13. A magnetic recording system comprising:
a flying magnetic head, and
a medium comprising a nonmagnetic substrate, and at least an underlayer, magnetic recording layer, and a protective layer sequentially laminated on the nonmagnetic substrate, wherein the underlayer is composed of ruthenium or an alloy of mainly ruthenium and has an undulating structure formed on the surface of the underlayer with ridge lines of concentric circles which have a pitch in the range of 5 to 50 nm, the undulating structure being a sinusoidal waveform in which an angle between a plane of the nonmagnetic substrate and a line connecting a top and a bottom of the undulating structure in a cross sectional plane perpendicular to the ridge line is in a range of 10 to 60 degrees;

the magnetic recording layer contains at least ferromagnetic crystal grains and a nonmagnetic component;

magnetic dots composed of the crystal grains with a grain size not smaller than 4 nm in the magnetic recording layer are aligned on the ridge lines of the underlayer, each magnetic dot bearing one bit of record and each of the magnetic dots being separated from each other by the nonmagnetic component;

with the proviso that superparamagnetic crystal grains on a bottom line of the undulating structure, if present, have a grain size less than 4 nm and do not exhibit magnetization.

14. The magnetic recording medium system according to claim 13, wherein the underlayer is composed of (i) a single crystal, or (ii) a polycrystalline structure with a grain boundary width not larger than 0.5 nm.

15. The magnetic recording medium system according to claim 13, wherein the magnetic recording layer contains superparamagnetic grains that have turned to a superparamagnetic substance and are located on the bottom line of the undulating structure of the underlayer surface.

16. The magnetic recording medium system according to claim 13, wherein the nonmagnetic substrate is a disk, on both surfaces of which are formed the underlayer, the magnetic recording layer, and the protective layer; and the underlayer has the undulating structure formed by ridge lines of concentric circles with a predetermined pitch on a surface of the underlayer.

17. The magnetic recording medium system according to claim 13, further comprising a soft magnetic backing layer provided between the nonmagnetic substrate and the underlayer.

18. A method of manufacturing a magnetic recording medium defined by claim 13, comprising a nonmagnetic substrate, and at least an underlayer, magnetic recording layer, and a protective layer sequentially laminated on the nonmagnetic substrate, wherein the underlayer is composed of ruthenium or an alloy of mainly ruthenium and has an undulating structure formed with ridge lines of concentric circles in a predetermined pitch on the surface of the underlayer; the magnetic recording layer contains at least ferromagnetic crystal grains and a nonmagnetic component; magnetic dots composed of the crystal grains with a grain size not smaller than 4 nm in the magnetic recording layer are aligned on the ridge lines of the underlayer, each magnetic dot bearing one bit of record; and each of the magnetic dots is separated by the nonmagnetic component from each other, the method comprising a step of physically processing a surface of the nonmagnetic substrate to form the undulating structure on the surface of the underlayer by reproducing the surface configuration of the nonmagnetic substrate in the surface configuration of the underlayer.

19. A method of manufacturing a magnetic recording medium defined by claim 13 comprising a nonmagnetic substrate, and at least an underlayer, magnetic recording layer, and a protective layer sequentially laminated on the nonmagnetic substrate, wherein the underlayer is composed of ruthenium or an alloy of mainly ruthenium and has an undulating structure formed with ridge lines of concentric circles in a predetermined pitch on the surface of the underlayer; the magnetic recording layer contains at least ferromagnetic crystal grains and a nonmagnetic component; magnetic dots composed of the crystal grains with a grain size not smaller than 4 nm in the magnetic recording layer are aligned on the ridge lines of the underlayer, each magnetic dot bearing one bit of record; and each of the magnetic dots is separated by the nonmagnetic component from each other, the method comprising a step of physically processing a surface of the underlayer to form the undulating structure on the surface of the underlayer.

20. A method of manufacturing the magnetic recording medium defined by claim 19, wherein the medium further comprises a soft magnetic backing layer provided between the nonmagnetic substrate and the underlayer and the method additionally comprises a step of physically processing a surface of the soft magnetic backing layer to form the undulating structure on the surface of the underlayer by reproducing the surface configuration of the backing layer in the surface configuration of the underlayer.

21. A magnetic recording medium comprising a nonmagnetic substrate, and at least an underlayer, magnetic recording layer, and a protective layer sequentially laminated on the nonmagnetic substrate, wherein the underlayer is composed of ruthenium or an alloy of mainly ruthenium and has an undulating structure which has a sinusoidal waveform with ridge lines which have a pitch in the range of 5 to 50 nm, in which an angle between a plane of the nonmagnetic substrate and a line connecting a top and a bottom of the undulating structure in a cross sectional plane perpendicular to the ridge line is in a range of 10 to 60 degrees, the magnetic recording layer contains at least ferromagnetic crystal grains and a nonmagnetic component, magnetic dots composed of the crystal grains with a grain size not smaller than 4 nm in the magnetic recording layer are aligned on a surface of the underlayer along the ridge lines, and each of the magnetic dots is separated by the nonmagnetic component from each other.

22. The magnetic recording medium according to claim 21, additionally comprising superparamagnetic crystal grains on a bottom line of the undulating structure which have a grain size less than 4 nm and do not exhibit magnetization.

23. A magnetic recording system comprising:

a flying magnetic head, and a medium comprising a nonmagnetic substrate, and at least an underlayer, magnetic recording layer, and a protective layer sequentially laminated on the nonmagnetic substrate, wherein the underlayer is composed of ruthenium or an alloy of mainly ruthenium and has an undulating structure formed on the surface of the underlayer with ridge lines of concentric circles which have a pitch in the range of 5 to 50 nm, the undulating structure being a sinusoidal waveform in which an angle between a plane of the nonmagnetic substrate and a line connecting a top and a bottom of the undulating structure in a cross sectional plane perpendicular to the ridge line is in a range of 10 to 60 degrees;

the magnetic recording layer contains at least ferromagnetic crystal grains and a nonmagnetic component; and magnetic dots composed of the crystal grains with a grain size not smaller than 4 nm in the magnetic recording layer are aligned on the ridge lines of the underlayer, each magnetic dot bearing one bit of record and each of the magnetic dots being separated from each other by the nonmagnetic component.

24. The magnetic recording system according to claim 23, additionally comprising superparamagnetic crystal grains on a bottom line of the undulating structure which have a grain size less than 4 nm and do not exhibit magnetization.

* * * * *